April 11, 1933.  J. A. L. RUWOLDT  1,903,597
AIR CLEANER FOR INTERNAL COMBUSTION ENGINES
Filed Dec. 23, 1929  2 Sheets-Sheet 1
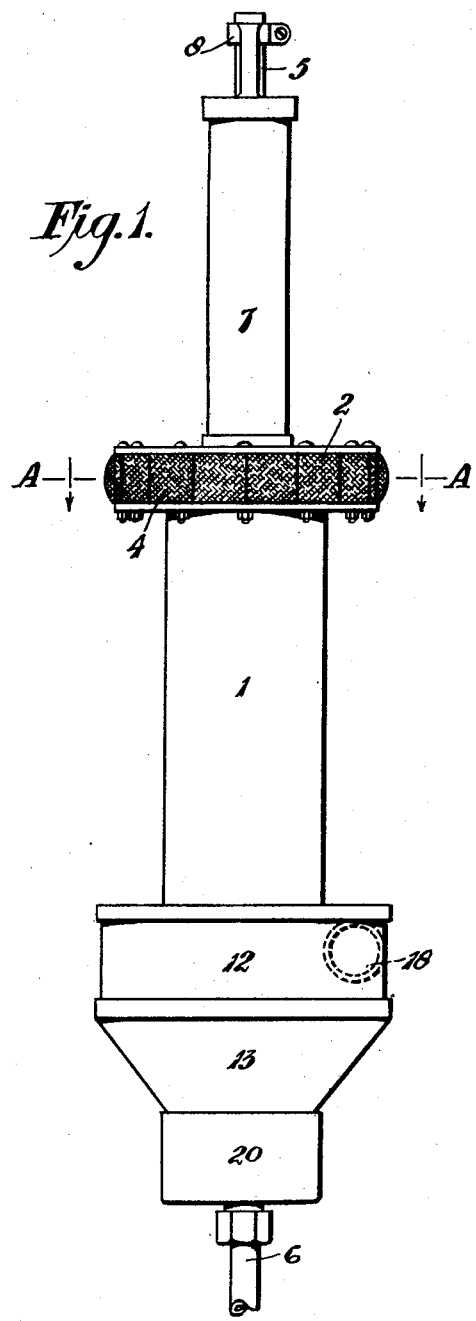
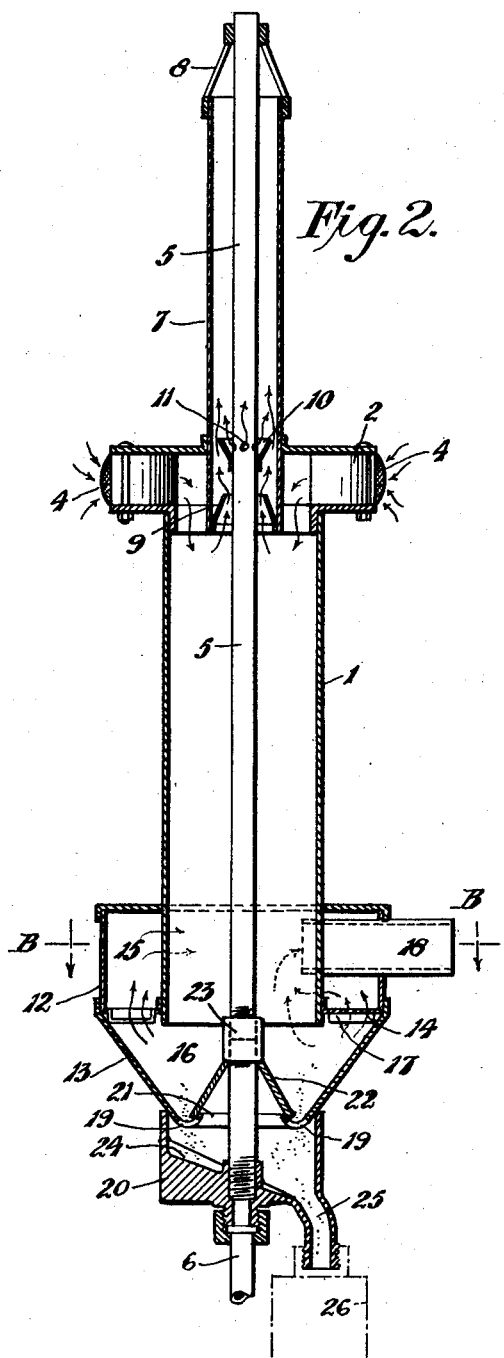
INVENTOR
J.A.L. RUWOLDT
BY *[signature]* ATTY.

April 11, 1933.  J. A. L. RUWOLDT  1,903,597
AIR CLEANER FOR INTERNAL COMBUSTION ENGINES
Filed Dec. 26, 1929  2 Sheets-Sheet 2

INVENTOR
J. A. L. RUWOLDT

Patented Apr. 11, 1933

1,903,597

UNITED STATES PATENT OFFICE

JOHANN ALBERT LUDWIG RUWOLDT, OF KEWELL, VICTORIA, AUSTRALIA

AIR CLEANER FOR INTERNAL COMBUSTION ENGINES

Application filed December 26, 1929, Serial No. 416,703, and in Australia July 9, 1929.

This invention relates to an improved air cleaner and air concentrator intended principally for use on the engines of farm tractors, but usable also with internal combustion engines of motor-cars, aeroplanes, power plants and other installations.

Various types of air cleaners have previously been devised, but most if not all of these have a retarding or choking effect on the intake manifold and thus tend to reduce the effective power of the engine. Moreover, such air cleaners are oftentimes of complicated structure, whereby they are liable to become easily choked or rendered inefficient through accumulations of dust and foreign materials.

The chief object of the present invention is to provide an improved type of air cleaner which does not have any appreciable choking effect on the engine. Another object is the provision of an air cleaner in which the dust particles are removed by whirling action without requiring the provision of gauze screens or like members liable to become quickly clogged with dust.

A still further object is to provide an air cleaner in which the heat of the engine exhaust is utilized to provide an upward current through the cleaner to remove the lighter dust particles and to condition the air by concentrating its oxygen content in its passage to the engine intake.

Referring to the accompanying drawings:

Figure 1 is a view in elevation of the improved air cleaner and concentrator.

Figure 2 is a longitudinal sectional view.

Figure 3:
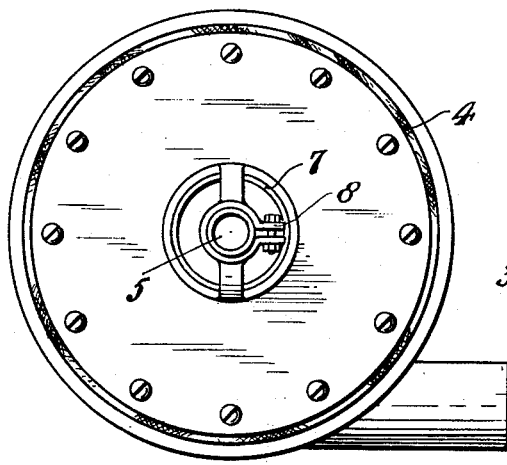
Figure 3 is a plan view of Figure 1.
Figure 4:
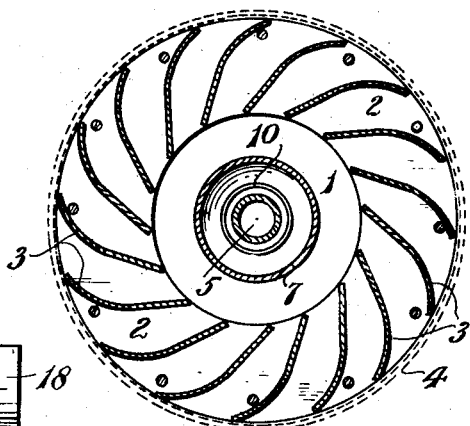
Figure 4 is a section on the line A—A of Figure 1.
Figure 5:
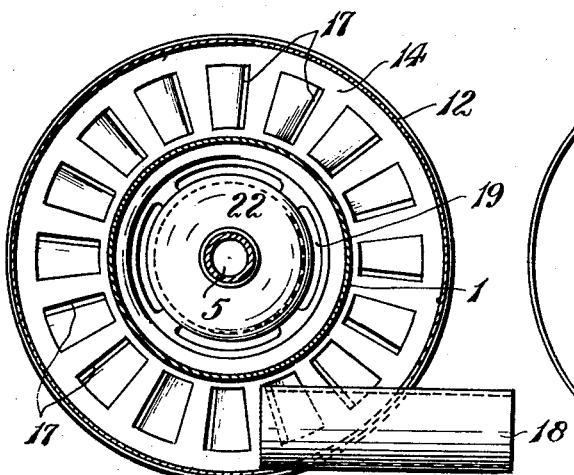
Figure 5 is a section on the line B—B of Figure 2.
Figure 6:
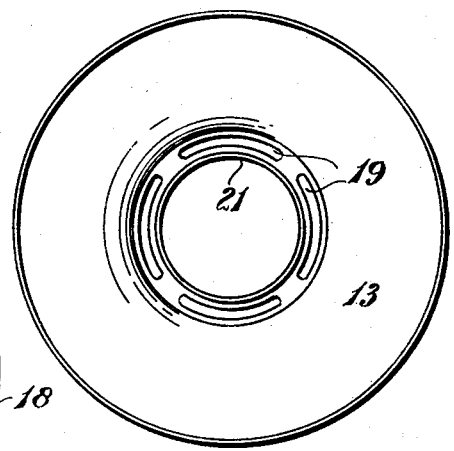
Figures 6 and 7 are detail views of the lower parts of the device.
Figure 7:
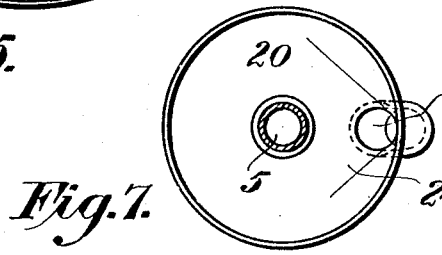

The improved air cleaner comprises a main casing 1 of cylindrical shape having at its upper end an air inlet 2. This inlet is of annular shape and is fitted with a series of curved vanes 3, which are angularly set as shown in Figure 4, so that the air entering through the inlet is caused to have a whirling action while passing downwardly through the casing. The exterior end of the air inlet 2 may be provided with a gauze screen 4 to prevent ingress of straw, chaff or other relatively large materials to the cleaner.

Extending upwardly through the centre of the main casing 1 is a tube or pipe 5, which is suitably connected at its lower end as by a coupling 6 to the engine exhaust. This pipe 5 functions to heat the central portion of the casing 1 and thus induce an upward current of heated air around the said pipe. The upper portion of said pipe 5 extends through a flue 7, which is mounted upon the casing 1 and has a clamp 8 to support the upper end of said pipe. The lower end portion of said flue 7 extends downwardly into the casing 1 for a distance sufficient to prevent direct connection with the air inlet 2, see Figure 2.

Fitted into the lower end of the flue 7 is a baffle 9 of conical shape adapted to direct the ascending heated current of air around the pipe 5 upwardly through the flue. Above said baffle 9 is a second baffle 10 which is fitted upon the pipe 5 and surrounds a series of openings 11 formed in said pipe. These openings allow portion of the exhaust gases to escape from the pipe 5 and pass upwardly through the flue as is indicated by arrows in Figure 2, thus assisting in the induction of the upward current of heated air through the central portion of the main casing 1.

The lower end of the main casing 1 extends into a cylindrical casing 12 which functions as a dust separating chamber. Said casing is of enlarged or widened construction compared with said main casing and it is provided with a sloping bottom 13. Said casing 12 is divided approximately centrally by a horizontal partition 14 thus forming upper and lower chambers 15 and 16. The end of the main casing 1 extends downwardly into the casing 12 to the level of the partition 14 so that the whirling stream of air passing down said casing is delivered into the lower chamber 16. The horizontal partition 14 is constructed having a series of radially arranged openings 17 through which the air passes upwardly from the lower chamber 16 into the upper chamber 15. From said upper chamber the air passes to the engine intake manifold through a conduit 18 fitted tangentially to the wall of the casing 12.

The sloping bottom 13 of the casing 12 is formed with a series of elongated holes 19, through which the dust and foreign materials separated from the air are discharged into a cup-shaped vessel 20. The lower portion of the sloping bottom has an upturned lip 21, upon which a hollow conical member 22 is supported. This conical member is retained in position by means of a coupling 23 on the pipe 5, or by other approved means. The cup-shaped vessel 20 has a sloping bottom 24 which directs the dust and foreign materials to a discharge outlet 25 leading to a suitable collecting receptacle 26.

In the operation of the air cleaner and concentrator, air is drawn through the inlet 2 by the induction of the engine and is caused by the angularly set vanes 4 to have a whirling action while passing downwardly through the main cassing 1. This whirling action of the air causes the air to be satisfactorily conditioned. The lighter particles of dust and foreign materials in the air pass inwardly to the central portion of the casing 1 and are carried upwardly and discharged by the upward current of heated air around the pipe 5.

The lighter gases are swept upwardly by the hot air current, while the oxygen concentrated air passes downwardly through the lower end of the casing 1 into the lower chamber 16. In this chamber the air is further conditioned by the separation of the heavier particles of dust and foreign materials which fall downwardly onto the sloping bottom 14 and are discharged into the collecting receptacle 26. The conditioned concentrated air passes upwardly through the radial openings 17 in the horizontal partition 14 into the chamber 15 and is thence drawn through the conduit 18 into the engine intake.

Modifications in construction and in the design of the features of the appliance may be made within the ambit of the invention as defined by the appended claiming clauses.

What I do claim is:

1. An improved air cleaner and concentrator for internal combustion engines comprising in combination, a main vertically disposed casing having air inlet openings, a plurality of inclined and curved vanes in said air inlet openings to cause the air to have a whirling action while passing downwardly through said casing, a dust separating chamber at the lower end of said casing formed with inner and outer inclined walls and having openings in its bottom for the passage of accumulated dust, a horizontal partition above the inclined walls dividing said chamber into upper and lower compartments, an outlet in the upper compartment connected to the engine intake, and openings in the horizontal partition allowing the cleaned conditioned air to pass to the upper compartment, the bottom walls of said openings being upwardly inclined.

2. An improved air cleaner and concentrator as in claim 1 and wherein the dust separating chamber has a sloping bottom with discharge openings therein, and a hollow conical member is supported on said bottom to direct the dust through said openings.

3. An improved air cleaner and concentrator for internal combustion engines comprising a vertically disposed casing having an air inlet, a plurality of curved and inclined vanes in the inlet to cause the air while passing downwardly through said casing to have a whirling action, means at the lower end of the vertically disposed casing for attachment to a manifold of an engine, whereby to draw the whirling air through the casing, means in the casing for conditioning the air by heat during this whirling action, and an outlet opening formed above the air inlet opening for ejecting a portion of the conditioned air.

4. An improved air cleaner and concentrator for internal combustion engines comprising a main casing having an air inlet so constructed as to cause the air to have a whirling action while passing downwardly through the casing, a pipe connected to the engine exhaust and passing upwardly through the center of said casing to induce an upward current of air around said pipe, a dust separating chamber at the lower end of said casing, means for discharging the collected dust from said separating chamber, means permitting the cleaned conditioned air to pass upwardly from said separating chamber to the engine intake manifold, and a flue at the upper end of the main casing surrounding the exhaust connected pipe and to receive the upward current of air from the center of said casing.

5. An improved air cleaner and concentrator for internal combustion engines comprising a main casing having an air inlet so constructed as to cause the air to have a whirling action while passing downwardly through the casing, a pipe connected to the engine exhaust and passing upwardly through the center of said casing to induce an upward current of air around said pipe, a dust separating chamber at the lower end of said casing, means for discharging the collected dust from said separating chamber, means for permitting the cleaned conditioned air to pass upwardly from said separating chamber to the engine intake manifold, a flue at the upper end of the main casing surrounding the exhaust connected pipe, said exhaust connected pipe being provided with an opening adjacent the lower end of the flue, and a baffle surrounding said opening.

In testimony whereof I affix my signature.

J. A. L. RUWOLDT.